United States Patent [19]

Stearn et al.

[11] 3,944,752
[45] Mar. 16, 1976

[54] TELEPHONE LINE STATUS INDICATOR

[75] Inventors: Theodore Stearn, Flushing; Paul V. De Luca, Port Washington, both of N.Y.

[73] Assignee: Porta Systems Corporation, Syosset, N.Y.

[22] Filed: Nov. 1, 1974

[21] Appl. No.: 520,021

[52] U.S. Cl............................ 179/81 C; 179/1 MN
[51] Int. Cl.²........................................... H04M 3/22
[58] Field of Search.......... 179/1 MN, 16 AA, 18 F, 179/18 FA, 84 L, 81 C, 99, 175.3 R, 175, 84 C; 307/311; 357/19

[56] References Cited
UNITED STATES PATENTS

| | | | |
|---|---|---|---|
| 3,469,036 | 9/1969 | Meri................................... | 179/84 L |
| 3,842,216 | 10/1974 | Owen et al......................... | 179/84 L |

FOREIGN PATENTS OR APPLICATIONS

| | | | |
|---|---|---|---|
| 884,832 | 12/1961 | United Kingdom............... | 179/18 F |

Primary Examiner—Kathleen H. Claffy
Assistant Examiner—Randall P. Myers
Attorney, Agent, or Firm—Charles E. Temko

[57] ABSTRACT

A device for indicating the status of one or more individual telephone lines with respect to whether the receiver is off hook or ringing without the necessity of dialing the line. A light-emitting diode and a neon lamp are positioned adjacent a discrete aperture visible to a user. The light-emitting diode responds to the presence of 24-volt normal tip line current, and is protected by a Zener diode against dial pulse currents employing ringing voltage. The neon lamp, in conjunction with a condensor carries the ringing current, and is so positioned adjacent the light-emitting diode that a glow in the neon tube is made to appear as an illumination of the light-emitting diode, whereby both bosy conditions appear to be indicated on the same light source.

4 Claims, 5 Drawing Figures

U.S. Patent  March 16, 1976  3,944,752
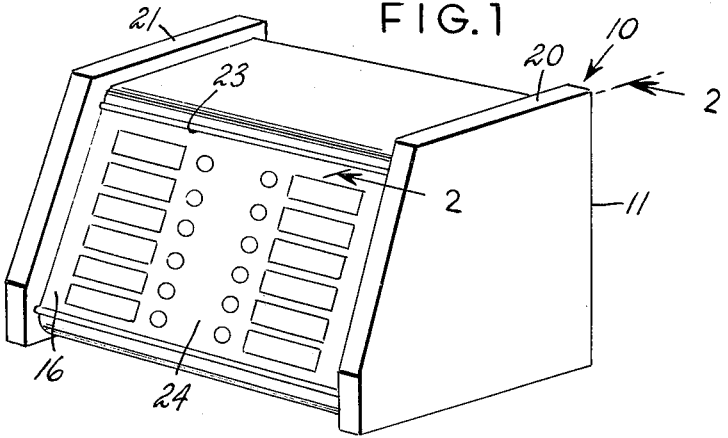
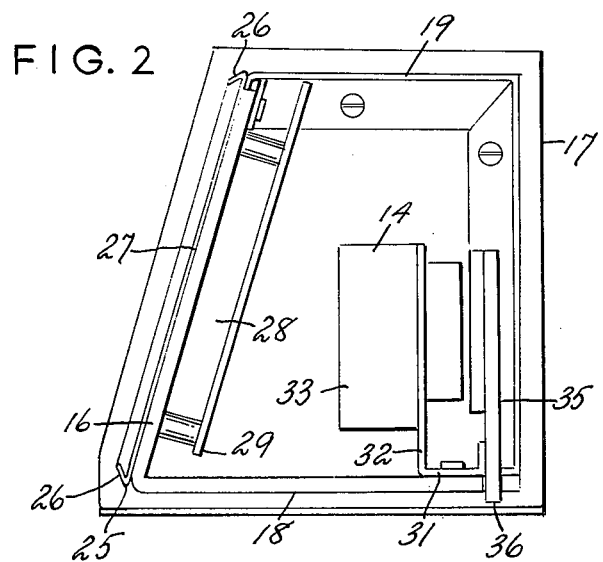
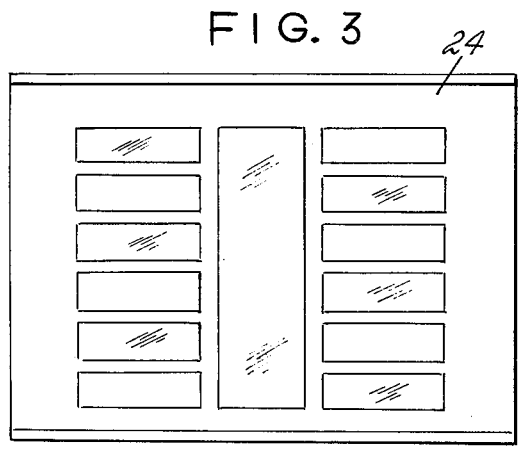
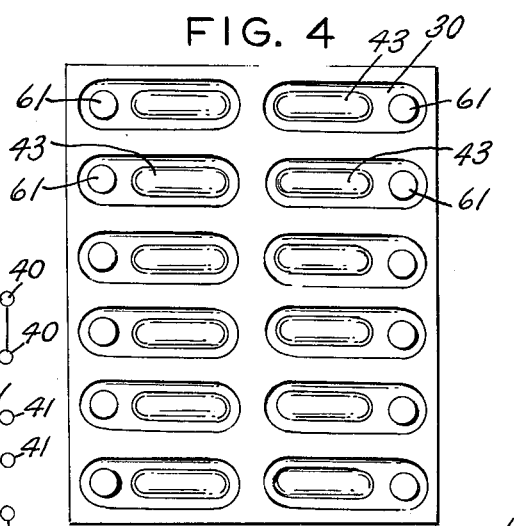
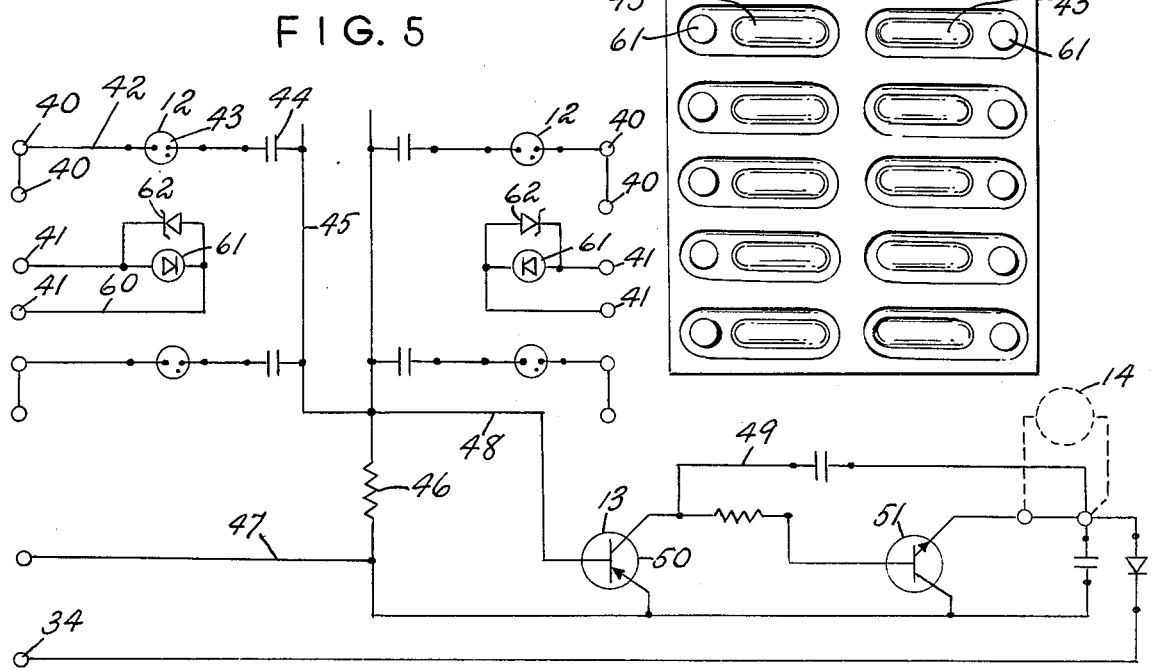

TELEPHONE LINE STATUS INDICATOR

BACKGROUND OF THE INVENTION

This invention relates primarily to the field of telephone equipment, and more particularly to an improved line status indicator device showing the condition of one or more telephone lines to a potential caller without the necessity of actually dialing a desired number. Devices of this type are generally known in the art, and are principally for inter-office communications where particular extensions are dialed directly without the necessity of going through a switchboard. The devices may also be used by a switchboard operator, where desired. Prior art devices include a case containing a plurality of light-emitting diodes, one for each sensed telephone line. Where the phone is in use, the light-emitting diode glows continuously indicating that the receiver is off the hook. Where the line is either receiving a ring current or transmitting a dial pulse, the normal 90-volt ringing current will cause the light-emitting diode to blink at a frequency corresponding to the ringing current. In prior art devices, the light-emitting diode is protected from direct communication with the ringing voltage by so-called opto-isolators which include a light generating source, and a photosensitive element passing a current corresponding to the intensity of light received. These devices are quite expensive, and have added substantially to the total cost of manufacture of the prior art devices.

SUMMARY OF THE INVENTION

Briefly stated, the invention contemplates the provision of an improved telephone line status indicator of the class described, in which the need for opto-isolators, one for each telephone line has been eliminated, with a corresponding simplification of circuitry and reduction of cost of manufacture. In a display panel, each line includes a light-emitting diode protected by a Zener diode against dial pulse voltage, and a neon lamp situated immediately adjacent the light-emitting diode in such manner that when the neon tube is illuminated, light is transmitted to the surface of the light-emitting diode whereby it appears to glow. Audible signal generating means is activated by a solid state circuit which senses the flow of a ringing voltage, and supplements the signal of the neon tube.

BRIEF DESCRIPTION OF THE DRAWINGS

In the drawings, to which reference will be made in the specification, similar reference characters have been employed to designate corresponding parts throughout the several views.

FIG. 1 is a view in perspective of an embodiment of the invention.

FIG. 2 is a central longitudinal sectional view as seen from the plane 2—2 in FIG. 1.

FIG. 3 is a view in elevation showing a front shield forming a part of the invention.

FIG. 4 is a view in elevation of a lamp supporting element normally disposed behind the structure shown in FIG. 3.

FIG. 5 is an electrical schematic diagram of the embodiment.

DETAILED DESCRIPTION OF THE DISCLOSED EMBODIMENT

In accordance with the invention, the device, generally indicated by reference character 10, comprises broadly: a casing element 11, a plurality of current detection circuits 12, a single ringing current detection means 13, and audible signal means 14.

The casing element 11 is preferably formed from wood and metallic and certain synthetic resinous materials, and includes a front wall 16, a rear wall 17, a bottom wall 18, a top wall 19, and side walls 20 and 21. The front wall 16 defines an opening 23 of rectangular configuration normally covered by a shield 24. The shield 24 is supported by a bracket 25, including horizontally disposed members 26 and an auxiliary wall 27 forming a recess 28 for a lamp support member 29 disposed immediately behind the shield 24.

The member 29 is best understood from consideration of FIG. 4, and includes a plurality of recesses 30.

The bottom wall 18 supports a bracket 31 having a vertical member 32 mounting a sonar alert element 33 of a type known in the art which is powered by a 16-volt A.C. source 34 (FIG. 5). The element 33 includes a pivotally movable baffle 35 having an outwardly-extending manually engageable member 36, by means of which the intensity of generated tone is adjusted.

Referring to FIG. 5, each of the circuits 12 includes ring contacts 40 and tip contacts 41 which are inter-connected to corresponding conductors (not shown) of the individual telephone line. Each ring contact 40 is connected by a conductor 42 to a neon lamp 43, through a capacitor 44 to a buss line 45, a resister 46 and a conduit 47 to ground. Another conductor 48 in series with the conductor 47 interconnects with a solid-state circuit 49 which includes first and second transistors 50 and 51, a capacitor 52, a resistor 53, a capacitor 54 and a diode 55. The circuit 49 is powered by the same 16-volt source 34, and forms a solid-state switch which conducts upon the detection of the normal 90-volt ringing circuit.

The tip contacts 41 are inter-connected through a conductor 60 to light-emitting diodes 61, each being inter-connected in parallel to a Zener diode 62 which protects the diodes 61 during the occurence of dial pulses. From a consideration of FIG. 5, it will be apparent that upon the presence of a ringing current, the corresponding neon lamp will glow, and with the flow of tip current, the corresponding light-emitting diode will glow. Normally, the light intensity of the neon lamp will be much greater than that of the light-emitting diode, and while it is possible to display the light output of both the neon lamp and the light-emitting diode, it is more desirable to indicate the presence of ringing and tip currents at substantially the same intensity, so that the device may visually resemble existing prior art devices. This is accomplished by placing the neon lamp in close juxtaposition to the respective light-emitting diodes, such that the light emanating from the neon lamp will fall upon the outer surface of the light-emitting diode, and cause it to appear to the viewer to be operative. The neon lamp is shielded from direct view by the user, and only the light-emitting diode is visible through the shield 24. Thus, light from either the neon tube or the light-emitting diode not only appear at approximately the same intensity, but they appear to emanate from the same location, i.e. a small opening adjacent a representation of a name corresponding to an individual telephone line.

It will be readily appreciated by those skilled in the art that the disclosed embodiment functions in exactly the same fashion as prior art devices which are considerably more expensive to manufacture, owing to the elimination of the necessity of opto-isolators, one for each telephone line, as a result of which the cost of production of the disclosed embodiment may be somewhat less than half of the cost of producing existing prior art devices employing opto-isolators. In addition, the disclosed circuitry permits the incorporation of an audible signal producing means responding to the presence of ringing currents, which signal may be eliminated at the preference of the user.

We wish it to be understood that we do not consider the invention limited to the precise details of structure shown and set forth in this specification, for obvious modifications will occur to those skilled in the art to which the invention pertains.

We claim:

1. An improved telephone line status indicator adapted to be connected to the tip and ring circuits of a telephone line to indicate the presence of tip and ring currents, comprising: a light-emitting diode, a Zener diode connected in parallel with said light-emitting diode, said light-emitting diode and Zener diode being connected in series with said tip circuit; a neon lamp in series with said ring circuit; and means for supporting said neon lamp and light-emitting diode for display in juxtaposed relation.

2. Structure in accordance with claim 1, including audible signal means and solid-state switch means in series with said ring circuit causing said audible means to operate upon the detection by said switch means of a ringing current.

3. Structure in accordance with claim 1, further characterized in said display means including a lamp support member supporting in juxtaposed relation a light-emitting diode and a neon lamp inter-connected to a single telephone line, means shielding direct view of said neon lamp by a user, said last mentioned means providing a visual opening overlying said light-emitting diode; whereby light emanating from said neon lamp may fall upon an outer surface of said light-emitting diode and give the appearance of said light-emitting diode in illuminated state.

4. Structure in accordance with claim 3, further characterized in said lamp support member having a plurality of recesses therein, each accommodating a related light-emitting diode and neon lamp, said shielding means having a corresponding plurality of openings overlying the light-emitting diode disposed in each said recess.

* * * * *